United States Patent
Gandhi et al.

(10) Patent No.: US 9,383,540 B1
(45) Date of Patent: Jul. 5, 2016

(54) SYSTEM AND METHOD FOR CONTROLLING THE FOCUS OF A LENS

(71) Applicant: Google Inc., Mountain View, CA (US)

(72) Inventors: Tarak Gandhi, San Diego, CA (US); Iain Richard Tyrone McClatchie, Los Altos, CA (US); Ian Rickard Muldoon, Redwood City, CA (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 14/034,778

(22) Filed: Sep. 24, 2013

Related U.S. Application Data

(60) Provisional application No. 61/720,081, filed on Oct. 30, 2012.

(51) Int. Cl.
| | |
|---|---|
| *G02B 7/00* | (2006.01) |
| *H04N 5/232* | (2006.01) |
| *G03B 7/22* | (2006.01) |
| *G03B 17/55* | (2006.01) |
| *G02B 7/02* | (2006.01) |

(52) U.S. Cl.
CPC .............. *G02B 7/028* (2013.01); *G02B 7/008* (2013.01); *G03B 7/22* (2013.01); *G03B 17/55* (2013.01); *H04N 5/23212* (2013.01)

(58) Field of Classification Search
CPC .......... G02B 7/028; G02B 7/008; G03B 7/22; G03B 17/55; H04N 5/23212
See application file for complete search history.

(56) References Cited

U.S. PATENT DOCUMENTS

| | | | | |
|---|---|---|---|---|
| 7,612,799 B1* | 11/2009 | Frank | ........................ | H04N 5/33 250/330 |
| 9,066,412 B2* | 6/2015 | Ershov | ................... | G02B 7/008 |
| 2006/0194130 A1* | 8/2006 | Roberts | ............... | G03F 7/70258 430/30 |
| 2008/0106796 A1* | 5/2008 | Kawada | ............... | G02B 3/0037 359/663 |
| 2010/0039714 A1* | 2/2010 | Bloch | .................. | H04N 5/2256 359/820 |
| 2010/0135356 A1* | 6/2010 | Schulz | ................... | G02B 7/008 374/161 |
| 2010/0275998 A1* | 11/2010 | Chang | ...................... | F24J 2/085 136/259 |
| 2011/0253349 A1* | 10/2011 | Ershov | ................... | G02B 7/008 165/109.1 |
| 2012/0170119 A1* | 7/2012 | Chu | ....................... | G03B 11/00 359/512 |
| 2013/0003025 A1* | 1/2013 | Cheng | ..................... | G03B 21/16 353/61 |
| 2013/0148059 A1* | 6/2013 | Park | ...................... | G02F 1/13306 349/72 |
| 2014/0253728 A1* | 9/2014 | Glockler | .............. | G03B 15/006 348/144 |
| 2015/0160536 A1* | 6/2015 | Lang | .................... | H04N 5/2251 348/374 |

OTHER PUBLICATIONS

Merchant, "Influence of Temperature on Focal Length for the Airborne Camera", MAPPS/ASPRS 2006 Fall Conference, San Antonio, Texas, Nov. 610, 2006—8 pages.

* cited by examiner

Primary Examiner — John Villecco
(74) Attorney, Agent, or Firm — Dority & Manning, P.A.

(57) ABSTRACT

In one aspect, a system for controlling the focus of a lens is disclosed. The system may generally include a sensor configured to detect changes in a focal distance of the lens and a thermal device configured to adjust a lens temperature of the lens. In addition, the system may include one or more computing devices communicatively coupled to the sensor and the thermal device. The computing device(s) may be configured to control the thermal device such that the lens temperature is adjusted in a manner that reduces variations in the focal distance.

17 Claims, 5 Drawing Sheets

SYSTEM AND METHOD FOR CONTROLLING THE FOCUS OF A LENS

FIELD

The present subject matter relates generally to image capture devices, such as cameras, and, more particularly, to a system and method for controlling the focus of a lens of an image capture device by controlling a temperature associated with the lens.

BACKGROUND

Conventional cameras generally include a lens, an image sensor and a controller communicatively coupled to the image sensor. As is generally understood, the lens is typically configured to receive light reflected from an object being imaged and project such light onto the image sensor. The image sensor may, in turn, be configured to detect the light projected from the lens to permit a digital image of the object to be generated. For example, the image sensor may be configured to convert the detected light into analog signals. The analog signals may then be converted by the camera's controller to digital data that can be used to generate a digital image.

With a typical camera lens, the focal distance of the lens varies with changes in temperature, thereby resulting in variations in the exact focus of the camera over small temperature ranges. To address this problem, athermal lens designs have been developed that utilize various different material combinations in an attempt to maintain the focus of a camera over a given temperature range. However, such athermal lens designs are typically quite complex and very expensive. Moreover, these designs fail to take into account that other operating parameters associated with the lens, such as air pressure, humidity and distance to the reflecting object, may also result in variations in the focal distance of the lens. This particularly true for vented lenses used in aerial photography, as such lenses typically included internal air spaces that change density with changes in pressure and/or humidity.

SUMMARY

Aspects and advantages of embodiments of the invention will be set forth in part in the following description, or may be obvious from the description, or may be learned through practice of the embodiments.

In one aspect, the present subject matter is directed to a computer-implemented method for controlling the focus of a lens. The method may generally include detecting, by one or more computing devices, a change in a focal distance of the lens, determining, by the computing device(s), a temperature adjustment for the lens that will reduce the variation in the focal distance and adjusting, by the computing device(s) a lens temperature of the lens based on the determined temperature adjustment.

In another aspect, the present subject matter is directed to a system for controlling the focus of a lens. The system may generally include a sensor configured to detect changes in a focal distance of the lens and a thermal device configured to adjust a lens temperature of the lens. In addition, the system may include one or more computing devices communicatively coupled to the sensor and the thermal device. The computing device(s) may be configured to control the thermal device such that the lens temperature is adjusted in a manner that reduces variations in the focal distance.

In a further aspect, the present subject matter is directed to an image capture device that includes a lens defining a focal distance. The image capture device may also include a sensor configured to detect changes in a focal distance of the lens and a thermal device configured to adjust a lens temperature of the lens. In addition, the image capture device may include one or more computing devices communicatively coupled to the sensor and the thermal device. The computing device(s) may be configured to control the thermal device such that the lens temperature is adjusted in a manner that reduces variations in the focal distance.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

A detailed discussion of embodiments, directed to one of ordinary skill in the art, is set forth in the specification, which makes reference to the appended figures, in which.

DETAILED DESCRIPTION

Figure 1:
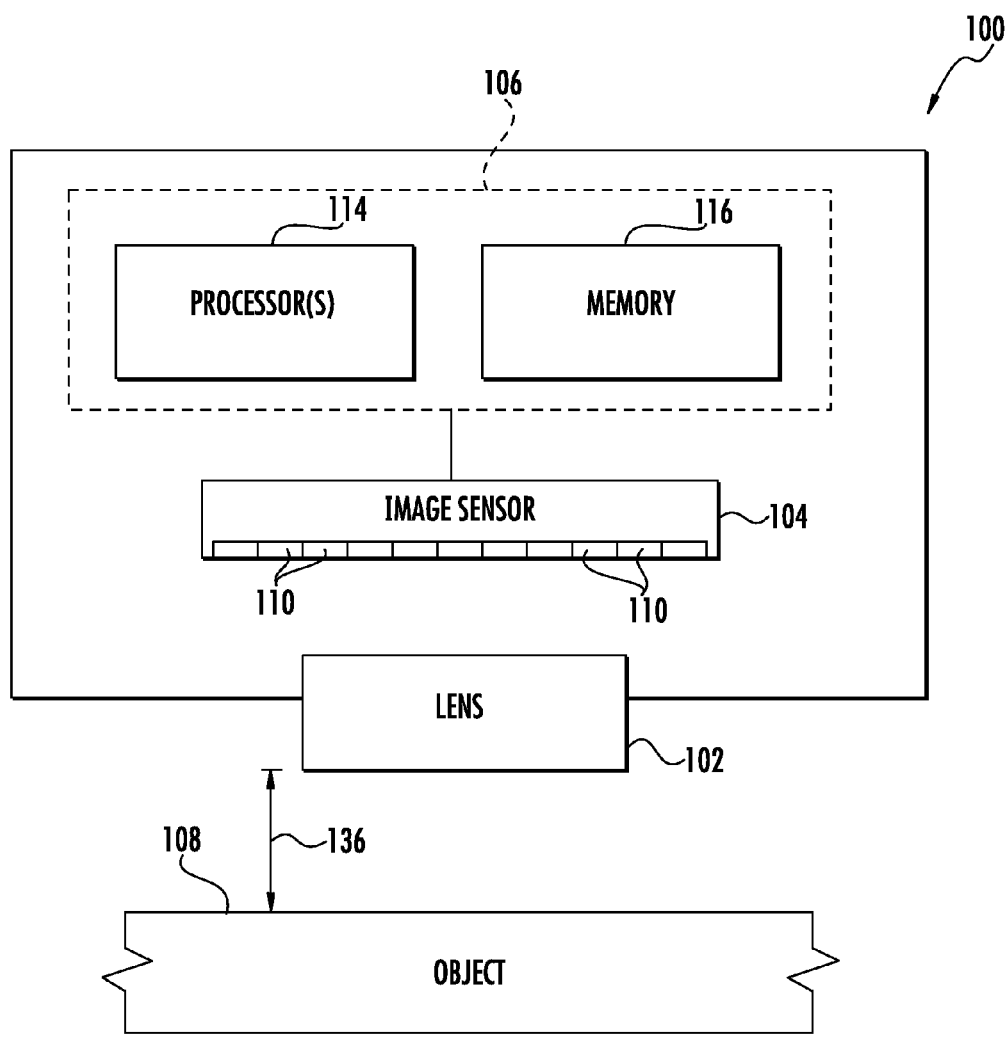
FIG. 1 illustrates a schematic view of one embodiment of an image capture device in accordance with aspects of the present subject matter.

Reference now will be made in detail to embodiments of the present subject matter, one or more examples of which are illustrated in the drawings. Each example is provided by way of explanation of the embodiments, not limitation. In fact, it will be apparent to those skilled in the art that various modifications and variations can be made to embodiments without departing from the scope or spirit of the embodiments. For instance, features illustrated or described as part of one embodiment can be used with another embodiment to yield a still further embodiment. Thus, it is intended that the present subject matter covers such modifications and variations as come within the scope of the appended claims and their equivalents.

In general, the present subject matter is directed to a system and method for controlling the focus of a lens, such as a lens used within an image capture device. As is generally understood, the focal distance of a lens can be described as a function of many variables. Typically, the focus of an image capture device is controlled by adjusting the mechanical configuration of the lens to accommodate changes in the focal distance. However, as will be described below, the present subject matter allows for control of the focus by setting the focal distance to a constant and solving for temperature.

Specifically, in several embodiments, one or more optical-related parameters associated with the lens (e.g., pressure, humidity and/or object distance) may be monitored in order to detect changes in the parameter(s). The focal distance variation resulting from each change of one or more of the optical-related parameters may then be reduced and/or offset by adjusting a lens temperature of the lens. For example, in several embodiments, the disclosed system may include a thermal device configured to adjust the lens temperature of the lens. In such embodiments, the thermal device may be controlled so that the lens temperature is sufficiently increased or decreased by an amount that results in a change in the focal distance that reduces or offsets the focal distance variation caused by the change in the optical-related parameter. For instance, if a lens has a focal distance sensitivity to temperature of −2 μm/K and a focal distance sensitivity to pressure of +2 μm/kPa, the lens temperature of the lens may be reduced 1 degree K for every 1 kPa reduction in pressure in order to maintain a constant focal distance.

It should be appreciated that the present subject matter may be advantageously utilized to control the focus of any lens used with any suitable camera and/or in any suitable environment. However, it is believed that use of the disclosed system and method may be particularly advantageous for controlling the focus of a lens contained within a camera designed for capturing aerial imagery; as such lens is typically exposed to a wide range of operating conditions (e.g., a wide range of operating pressures and/or object distances).

Referring now to the drawings, FIG. 1 illustrates a schematic diagram of one embodiment of an image capture device 100. As shown, the image capture device 100 may generally include many of the typical components of a digital camera, such as a lens 102, an image sensor 104 and a controller 106. As is generally understood, the lens 102 may be configured to receive light reflected from an object 108 being imaged and project and/or focus such light onto the image sensor 104. The image sensor 104 may, in turn, be configured to detect the light projected from the lens 102 to permit a digital image of the object 108 to be generated. For example, the image sensor 104 may include a plurality of sensing elements 110 (e.g., photo detectors, photo diodes, CCD sensors or CMOS sensors and/or any other suitable image sensing elements) configured to detect light and convert such detected light into analog signals that may be used to generate a digital image.

Figure 2:
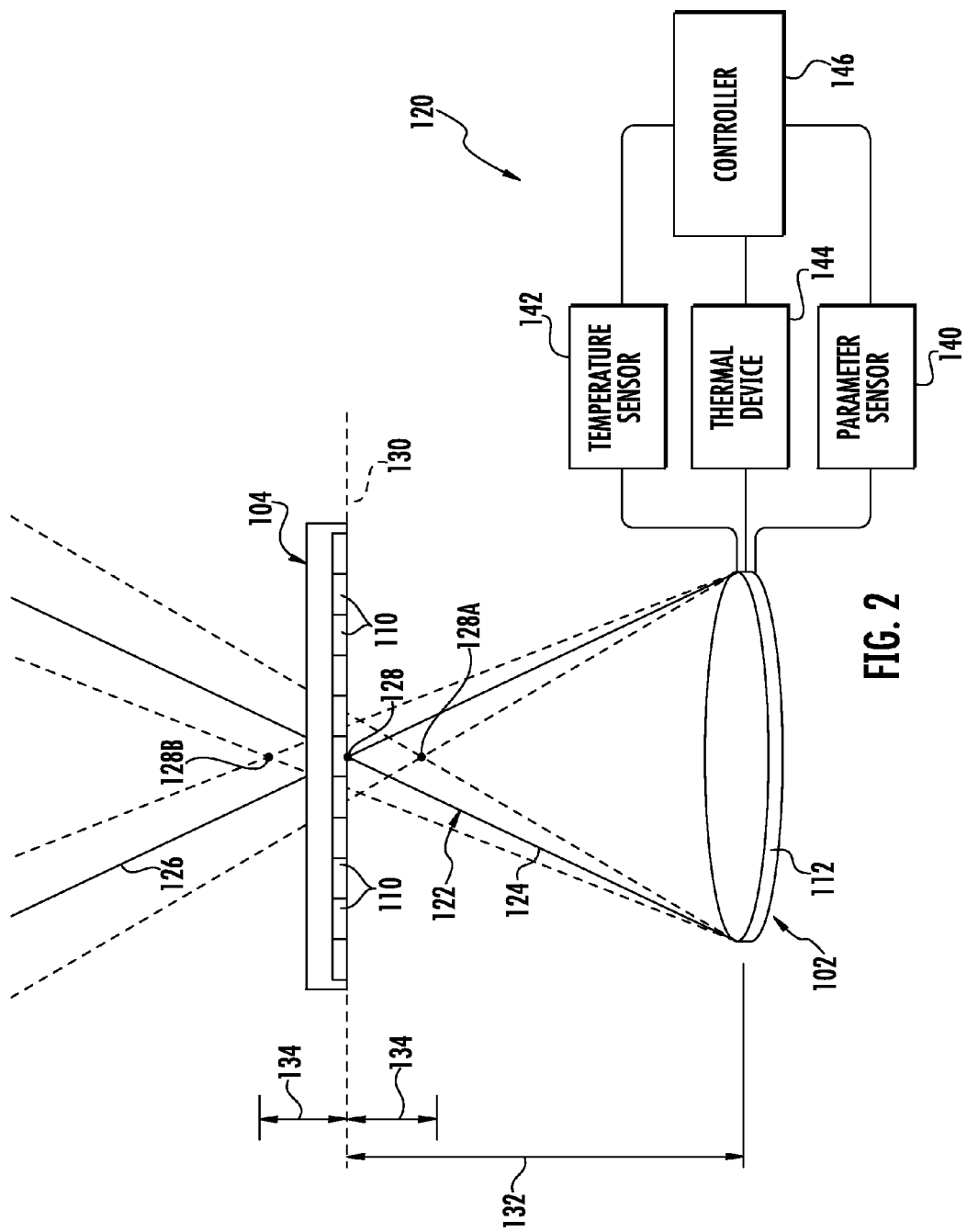
FIG. 2 illustrates a simplified view of one embodiment of a system for controlling the focus of a lens in accordance with aspects of the present subject matter.

The lens 102 may generally be any suitable optical element and/or combination of optical elements configured to focus light onto the image sensor 104. For example, as shown in FIG. 2, in one embodiment, the lens 102 may simply include a single lens element 112 configured to focus light reflected from the object 108 being imaged. Alternatively, as will be described below with reference to FIG. 7, the lens 102 may include multiple lens elements, such as one or more singlet, doublet and/or triplet lens elements, disposed within a suitable lens housing. In other embodiments, various other suitable optical elements may also be included within the lens 102, such as one or more mirrors, prisms, windows and/or any other known optical element.

Moreover, in several embodiments, the lens 102 may be configured as a temperature-sensitive lens and, thus, the optical properties of the lens 102 may be configured to vary with changes in temperature. For instance, as will be described below, the focal distance of the lens 102 may increase or decrease as a temperature associated with the lens 102 varies. As used herein, the term "temperature-sensitive lens" refers to a lens whose focal distance continuously changes with changes in temperature assuming all other operating parameters associated with the lens remain constant (e.g., a non-athermal lens). For instance, a temperature sensitive lens may have a specific focal distance sensitivity to temperature (e.g., −1 microns/K) for any given temperature range.

It should be appreciated that, although the image capture device 100 is shown in FIG. 1 as including a single image sensor 104, the image capture device 100 may generally include any number of image sensors 104. For example, in several embodiments, the image capture device 100 may include a plurality of image sensors 104 arranged in a one- or two-dimensional array.

Referring still to FIG. 1, the controller 106 of the image capture device 100 may generally be configured to control the operation and/or functionality of the various components of the image capture device 100, such as the image sensor 104. In addition, the controller 106 may also be configured to receive the analog signals generated by the image sensor 104 for subsequent processing and/or storage. For example, as is generally understood, the controller 106 may be configured to convert the analog signals generated by the sensing elements 110 into digital data that may be presented in the form of a digital image.

It should be appreciated that controller 106 may generally be any suitable computing device and/or other processing device that is capable of performing the functions described herein, including any suitable combination of computing devices. Thus, in one embodiment, the controller 106 may generally include one or more processor(s) 114 and associated memory 116. The processor(s) 114 may be any suitable processing device(s) known in the art. Similarly, the memory 116 may generally be any suitable computer-readable medium or media, including, but not limited to, RAM, ROM, hard drives, flash drives, or other memory devices. As is generally understood, the memory 116 may be configured to store information accessible by the processor(s) 114, including instructions that can be executed by processor(s) 114. The instructions may be any set of instructions that when executed by the processor(s) 114, cause the processor(s) 114 to provide desired functionality. For instance, the instructions can be software instructions rendered in a computer-readable form. When software is used, any suitable programming, scripting, or other type of language or combinations of languages may be used to implement the teachings contained herein. Alternatively, the controller 106 may include any suitable hardware that allows the controller 106 to control the functionality of the image capture device 100. In such an embodiment, for example, the instructions for the controller 106 may be implemented by hard-wired logic or other circuitry, including, but not limited to application-specific circuits.

It should also be appreciated that the controller 106 may be configured as a separate component from the image sensor 104, such as that shown in FIG. 2, and/or the controller 106 may be configured as an integral component of the image sensor 104. For instance, in one embodiment, the image sensor 104 may, itself, include a processor 114 and associated memory 116 for processing the signals generated by the sensing elements 110 and/or for storing relevant data. Additionally, it should be appreciated that controller 106 may be a single processing device or any combination of processing devices that may be utilized to control the operation and/or functionality of the components of the image capture device 100.

Referring now to FIG. 2, a schematic diagram of one embodiment of a system 120 for controlling the focus of a lens, such as the lens 102 described above with reference to FIG. 1, is illustrated in accordance with aspects of the present subject matter. As is generally understood, the light or image projected onto the image sensor 104 from the lens 102 may generally be focused into a light cone 122 including both a converging portion 124 and a diverging portion 126. The intersection of the converging and diverging portions 124, 126 (indicated by point 128) may generally be defined on a plane 130 corresponding to the plane of optimal focus or focal plane of the lens 102 (e.g., the plane upon which the image projected from the lens 102 is completely focused). As shown in FIG. 2, the focal plane 130 is separated from the lens 102 by a focal distance 132. Thus, it is generally desirable to space the image sensor 104 apart from the lens 102 by a distance equal to the focal distance 132 such that an image plane of the image sensor 104 (defined by the outer surface of the sensing elements 110) is aligned along the focal plane 130, thereby ensuring that the light detected by the image sensor 104 is in focus.

It should be appreciated by those of ordinary skill in the art that the focal plane 130 of an ideal lens may be exactly planar. However, due to curvature, the focal plane 130 of an actual lens 102 may be slightly curved or non-planar. Thus, the term "focal plane" is used herein to describe any suitable reference plane, line, curve or surface along which the image projected from the lens 102 is completely focused.

As indicated above, the focal distance 132 of the lens 102 may be subject to variations due to changes in certain operating parameters associated with the lens 102. For example, changes in the ambient air pressure around and/or within the lens 102 may cause a variation in the focal distance 132. This is particularly true for vented lenses having internal air spaces that change density with changes in the ambient pressure. Thus, as the air pressure around and/or within the lens 102 increases or decreases, the position of the focal plane 130 relative to the image sensor 104 may change. For instance, as shown in FIG. 2, due to a change in air pressure, the focal distance 132 may increase or decrease by a given amount (referred to herein as the focal distance variation or "FD variation 134") such that the focal plane 130 shifts ahead of or behind the initial focal point 128 (indicated by points 128A and 128B, respectively), thereby causing the lens 102 to be out-of-focus. However, as will be described below, the amount of this FD variation 134 may be reduced and/or offset by adjusting a lens temperature of the lens 102 in order to maintain the lens 102 in focus despite changing operating conditions.

It should be appreciated that, although the present subject matter will generally be described herein with reference to FD variations 134 caused by changes in the ambient air pressure around and/or within the lens 102, the disclosed system and method may generally be used to account for changes in any suitable operating parameters associated with the lens 102 that may result in FD variations 134 (referred to herein as "optics-related parameters"). For example, changes in the humidity around and/or within the lens 102 may result in FD variations 134 that may be reduced and/or offset by adjusting a lens temperature of the lens 102. Similarly, changes in the object distance of the lens 102 (e.g., a distance 136 (FIG. 1) defined between the lens 102 and the object 108 being imaged) may also result in FD variations 134. Various other optics-related parameters capable of causing FD variations 134 should be apparent to those of ordinary skill in art and are intended to be covered by the disclosure provided herein. However, it should be appreciated that, as used herein, the term "optics-related parameter" does not include the lens temperature of the lens 102.

To account for FD variations 134, the disclosed system 120 may generally be configured to monitor changes in the optics-related parameter(s) and, based on such changes, adjust a lens temperature of the lens 102. Thus, as shown in FIG. 2, in several embodiments, the system 120 may generally include a parameter sensor 140 configured to monitor the optics-related parameters associated with the lens 102 and a temperature sensor 142 configured to monitor the lens temperature. In addition, the system 120 may include a thermal device 144 configured to adjust the lens temperature and a controller 146 configured to actively control the operation of the thermal device 144 based on the measurements provided by the sensors 140, 142.

In general, the parameter sensor 140 may be any suitable sensor(s) and/or sensing device(s) that is capable of detecting changes in one or more of the optics-related parameter(s) associated with the lens 102. For example, in one embodiment, the parameter sensor 140 may be one or more pressure sensors configured to detect changes in the ambient air pressure around and/or within the lens 102. In another embodiment, the parameter sensor 140 may be one or more humidity sensors configured to detect changes in the humidity around and/or within the lens 102. In a further embodiment, the parameter sensor 140 may be a range finder, altimeter or other altitude sensor (e.g., for use with aerial imagery) and/or any other suitable device that is capable of detecting changes in the object distance 136 (FIG. 1) of the lens 102. Alternatively, a previously collected digital elevation model (DEM) sampled using the current GPS coordinates may be used to track changes in the object distance 136.

Similarly, the temperature sensor 142 may generally be any suitable sensor(s) and/or sensing device(s) (e.g., one or more thermocouples, thermistors, and/or the like) configured to detect a lens temperature of the lens 102. As used herein, the term "lens temperature" may refer to any temperature associated with the lens 102, such as the temperature of any component associated with the lens 102 and/or the temperature of the air within and/or adjacent to the lens 102. Thus, in one embodiment, the temperature sensor 142 may be configured to measure the temperature of the air contained within any internal air spaces of the lens 102, such as the air spaces 262 shown below in FIG. 7. In another embodiment, the temperature sensor 140 may be configured to measure a surface temperature or an internal temperature of a lens element 112 of the lens 102 or a temperature of any other suitable component of the lens 102 (e.g., a lens housing 260 (FIG. 7) and/or a lens spacer 264 (FIG. 7)).

The measurements provided by the parameter and temperature sensors 140, 142 may generally be utilized by the controller 146 to adjust the lens temperature of the lens 102 by controlling the operation of the thermal device 144. Specifically, in several embodiments, the controller 146 may be configured to determine the FD variation caused by a detected change in one or more of the optics-related parameters and, based on such FD variation, calculate a temperature adjustment necessary to reduce and/or offset the FD variation. The controller 146 may then control the operation of the thermal device 144 in order to actively adjust the lens temperature of the lens 102.

It should be appreciated that the controller 146 may generally be any suitable computer and/or other processing device that is capable of performing the functions described herein. Thus, in one embodiment, the controller 146 may be the controller 106 described above with reference to FIG. 1, and thus, may form part of the image capture device 100. Alternatively, the controller 146 may be a separate computer and/or processing device having a suitable processor(s) and associated memory and/or suitable hardware capable of implementing the methods and/or otherwise providing the functionality described herein. In such an embodiment, the controller 146 may be communicatively coupled to the controller 106 of the image capture device 100 to allow data, control signals and/or the like to be transmitted between the controllers 146, 106.

Figure 3:
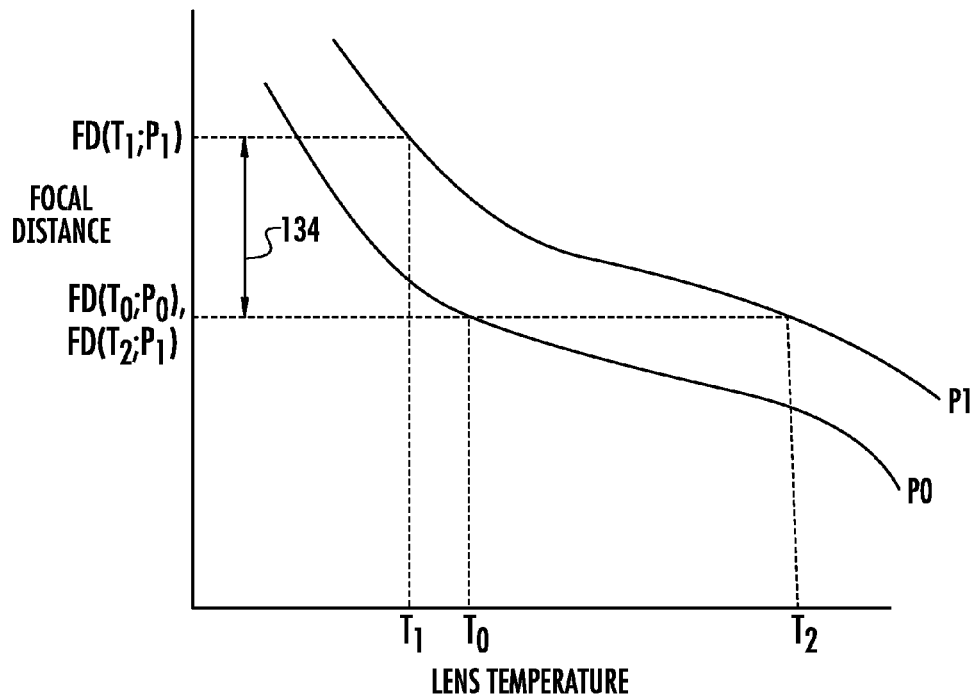
FIG. 3 illustrates a graph providing an example relationship between pressure, lens temperature and the focal distance of a lens.
Figure 4:
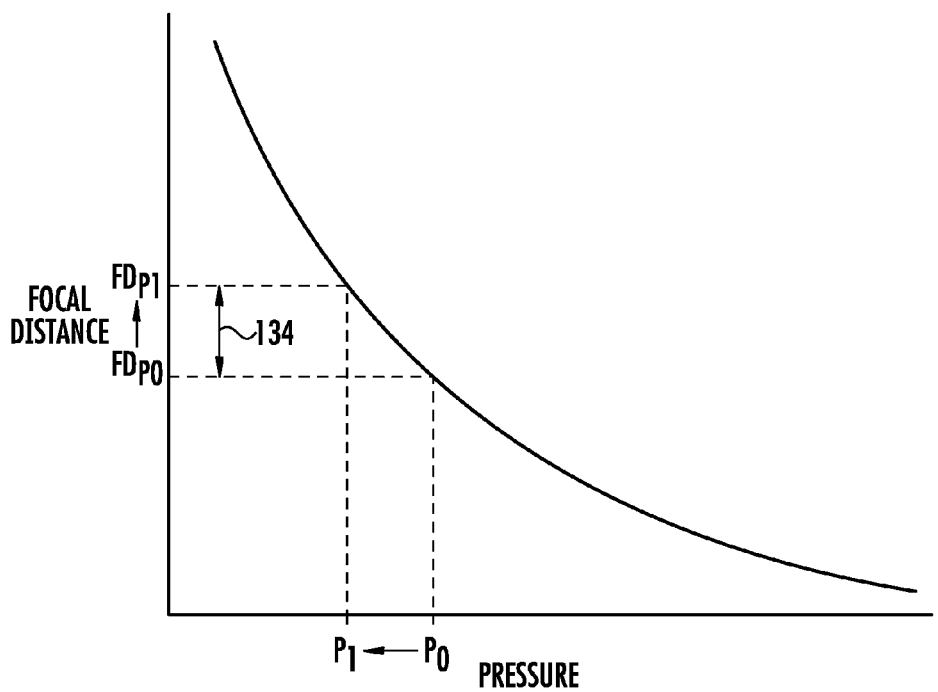
FIG. 4 illustrates a graph providing an example relationship between pressure and the focal distance of a lens.

In several embodiments, the controller 146 may be provided with known mathematical relationships (e.g., transfer functions) that correlate the focal distance 132 of the lens 102 to the optics-related parameter(s) and the lens temperature of the lens 102. These known relationships may be utilized by the controller 146 to calculate the FD variation and the required temperature adjustment for the lens 102. For instance, FIGS. 3 and 4 illustrate graphs providing example relationships that may be stored within the controller's memory. As shown in FIG. 4, by knowing the relationship between pressure, lens temperature and the focal distance 132 of the lens 102, the controller 146 may be configured to calculate the FD variation for a given change in pressure and temperature. For instance, the lens 102 may be focused at a given set of operating parameters, such as an initial pressure ($P_0$) and an initial lens temperature ($T_0$), which may be correlated to an initial focal distance of the lens 102 ($FD(T_0; P_0)$). Thereafter, as the pressure and lens temperature changes, the parameter sensor 140 and temperature sensor 142 may provide the controller 146 with a new pressure measurement ($P_1$) and lens temperature measurement ($T_1$), which may be correlated to a new focal distance for the lens 102 ($FD(T_1; P_1)$). By comparing the determined values for $FD(T_0; P_0)$ and $FD(T_1; P_1)$, the FD variation 134 due to the change in pressure/temperature may then be calculated by the controller 146.

The calculated FD variation 134 may then be utilized by the controller 146 to determine the temperature adjustment necessary to reduce and/or offset the FD variation 134. Specifically, the calculated FD variation 134 may be used calculate the desired focal distance for the lens 102 $FD(T_2; P_1)$, which may, in one embodiment, be equal to the initial focal distance of the lens 102 $FD(T_0; P_0)$. For instance, in the example shown in FIG. 3, the change in pressure resulted in an increase in the focal distance of the lens 102 (e.g., a positive FD variation 134). Accordingly, to completely offset the FD variation 134, the value for the FD variation 134 may be subtracted from the current focal distance $FD(T_1; P_1)$ to determine the desired focal distance $FD(T_2; P_1)$ (or $FD(T_0; P_0)$), which may then be correlated to a desired lens temperature ($T_2$). Thereafter, based on the measurements provided by the temperature sensor 142, the controller 146 may actively control the thermal device 144 in order to adjust the actual lens temperature to the desired lens temperature $T_2$, thereby cancelling the FD variation 134 caused by the change in pressure.

It should be appreciated that, in instances in which there is a change in pressure (e.g., from $P_0$ to $P_1$) without an associated change in lens temperature (e.g. the lens temperature remains at $T_0$), the lens temperature may similarly be adjusted to account for the change in pressure. For example, FIG. 4 illustrates an example relationship between pressure and the focal distance 132 of the lens 102. By knowing this relationship, the controller 146 may be configured to calculate the FD variation 134 for any given change in pressure (e.g., the variation between $FD_{P0}$ and $FD_{P1}$). This calculated FD variation 134, along with the known relationship existing between the lens temperature and the focal distance 132, may then be utilized by the controller 146 to determine the temperature adjustment necessary to reduce and/or offset the FD variation 134.

It should also be appreciated that the graphs illustrated in FIGS. 3 and 4 are simply provided for explanation purposes and, thus, are not intended to be an accurate representation of the actual relationships that may exist between pressure, temperature and focal distance for a given lens. However, one of ordinary skill in the art should readily appreciate that such relationships may be determined for a particular lens 102 by modeling the configuration of the lens, through experimentation and/or using any other suitable analytical means and/or method known in the art.

Figure 5:
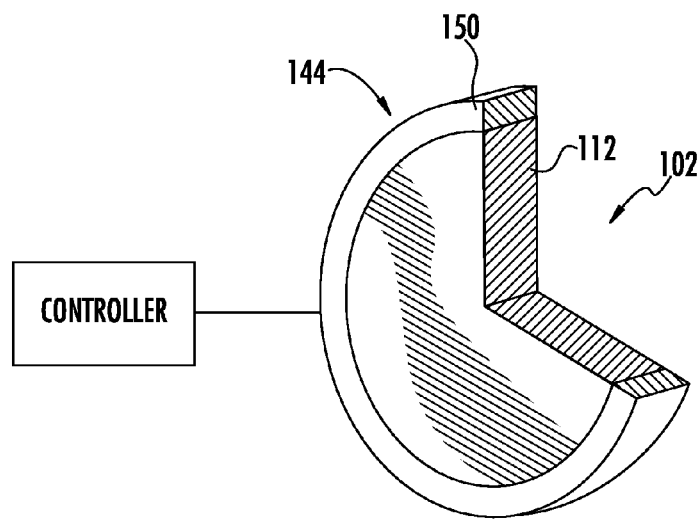
FIG. 5 illustrates a perspective, partial cut-away view of one embodiment of a lens element having a heating and/or cooling element wrapped around the outer circumference thereof.

Referring still to FIG. 2, it should be appreciated that the thermal device 144 of the disclosed system 120 may generally be any suitable electronically controllable device that is capable of adjusting the lens temperature of the lens 102. For example, in several embodiments, the thermal device 144 may be a heating element (e.g., a resistance wire(s), heating coil(s), induction heater(s), heat exchanger(s), light source(s) such as infrared LEDs, and/or the like) and/or a cooling element (e.g., a thermoelectric cooling device(s), fan(s), heat exchanger(s) and/or the like) disposed adjacent to and/or within the lens 102 that is configured to increase and/or decrease the lens temperature via radiation, convection and/or conduction. For example, as shown in the perspective, partially cut-away view of FIG. 5, a suitable heating and/or cooling element 150 may be wrapped around the outer circumference of a lens element 112 of the lens 102. Alternatively, the heating and/or cooling element 150 may be wrapped around any other suitable component of the lens 102, such as the lens housing 260 and/or the spacer 264 described below with reference to FIG. 7.

Figure 6:
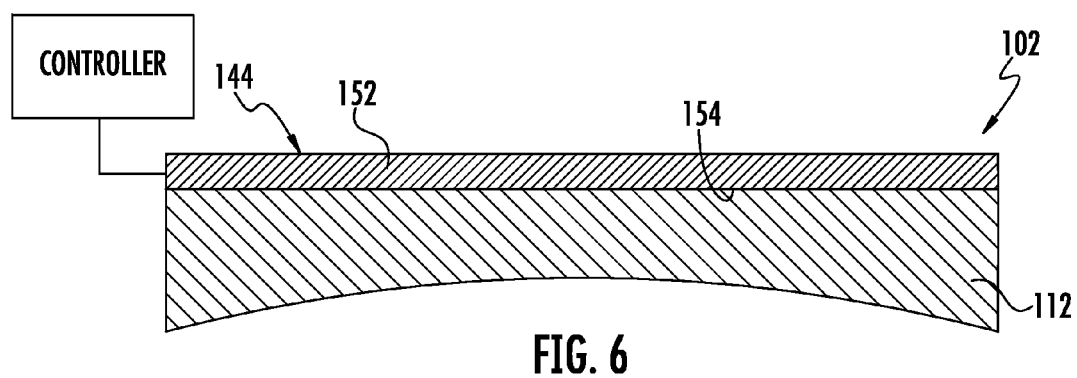
FIG. 6 illustrates a cross-sectional view of one embodiment of a lens element having a transparent, conductive film or coating applied to an outer surface thereof.

In another embodiment, the thermal device 144 may be a transparent, conductive coating applied to a portion of the lens 102 (e.g., a transparent conducting oxide film, such as an indium tin oxide coating or a fluorine doped tin oxide coating). For instance, as shown in the cross-sectional view of FIG. 6, a transparent, conductive film 152 may be formed along all or a portion of an outer surface 154 of a lens element 112 of the lens 102. In such an embodiment, a current may be supplied to the conductive film 152 by the controller 146 (or any other suitable current source coupled to the controller 146) to generate heat and, thus, adjust the lens temperature of the lens 102. As an alternative to applying a film or coating to the lens element 112, a suitable transparent, conductive material may be embedded within the lens element 112 and coupled to a current source to allow for adjustments of the lens temperature.

It should be appreciated that, as an alternative to indirectly detecting changes in the focal distance 132 of the lens 102 by monitoring changes in the optic-related parameter(s) and correlating such changes to the focal distance 132, the focus error caused by changes in the focal distance 132 may be directly measured. Thus, as changes in the focal distance 132 are detected, the lens temperature may be adjusted to allow for the desired focal distance 132 to be maintained. For instance, the controller 146 may be a proportional-integral-derivative (PID) controller and may be configured to calculate the error between the measured and desired focal distances 132 and, based on such error calculation, control the thermal device 144 in order to appropriately adjust the lens temperature.

In such an embodiment, changes in the focal distance 132 may be detected using any suitable means and/or method known in the art. For instance, in one embodiment, the image sensor 104 of the image capture device 100 may be slanted relative to the lens 102 and may define a fixed readout window (e.g., the fixed area defined by the sensor elements 110). In such an embodiment, as the focal distance 132 changes, one side of the images captured by the image sensor 104 may become more blurry than the other side due to the angled orientation of the sensor 104. The lens temperature may then be adjusted up or down based on which side of the images is the most blurry. For instance, if the top of each image has become more blurry than the bottom, it may be an indication that the focal distance 132 has increased/decreased due to a change in one or more of the optics-related parameter. In such an embodiment, the lens temperature may then be appropriately adjusted in order to reduce or offset the FD variation. In further embodiments, any other suitable means and/or method known in the art for detecting changes in the focal distance 132 of a lens 102 may be used in accordance with the present disclosure so as to a provide an input for adjusting the lens temperature.

Figure 7:
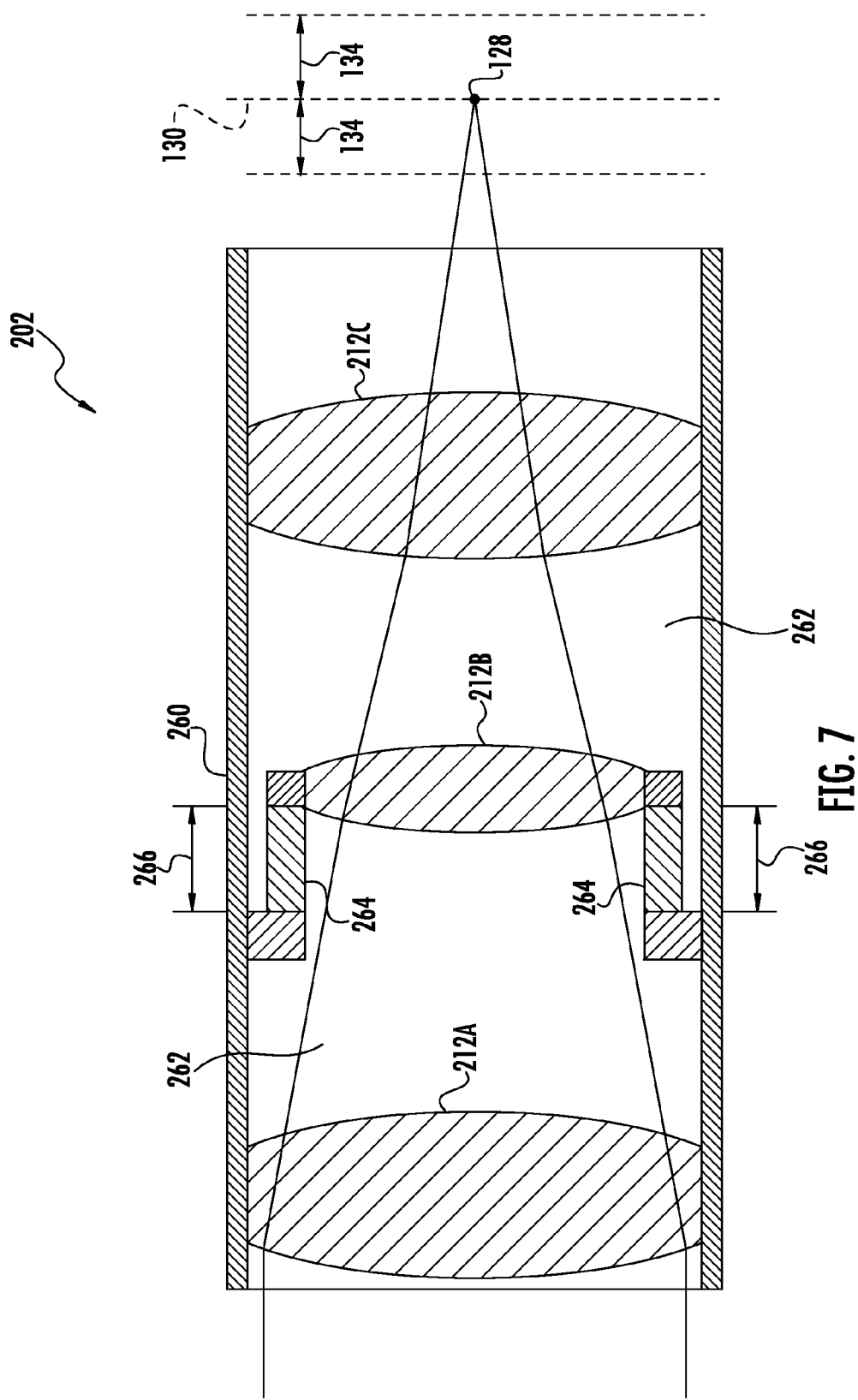
FIG. 7 illustrates a cross-sectional view of one embodiment of a configuration of a temperature sensitive lens.

Referring now to FIG. 7, a simplified view of one embodiment of a configuration for a temperature sensitive lens 202 is illustrated in accordance with aspects of the present subject matter. As shown, the lens 202 may include a plurality of lens elements 212A, 212B and 212C disposed within a lens housing 260. For instance, in the illustrated embodiment, the lens 202 includes a front lens element 212A, a middle lens element 212B and a back lens element 212C, with the lens elements 212A, 212B, 212C being spaced apart from one another such that internal air cavities or spaces 262 are defined within the lens housing 260 between each pair of adjacent lens elements. However, in other embodiments, the lens 202 may include any other number of lens elements 212A, 212B, 212C, such as less than three lens elements or greater than three lens elements.

Additionally, the lens 202 may include a temperature sensitive spacer 264 coupled between the lens housing 260 and one or more of the lens elements 212A, 212B, 212C. For example, as shown in FIG. 7, the spacer 264 may be coupled between the lens housing 260 and the middle lens element 212B. In general, the spacer 264 may be formed from any suitable temperature sensitive material that is configured to expand and contract with temperature changes (e.g., a polymer material). Thus, in the illustrated embodiment, as a length 266 of the spacer 264 increases or decreases with changes in the lens temperature (e.g., changes in the air temperature around the spacer 264 and/or changes in the temperature of the spacer 264 itself), the middle lens element 212B may be moved relative to the front and back lens elements 212A, 212C, thereby causing a shift in the focal plane 130 of the lens 202. For example, as shown in FIG. 7, a temperature variation within the lens 202 that causes a change in the length 266 of the spacer 264 may result in an FD variation 134 that shifts the focal plane 130 forward or back of the original focal point 128. Accordingly, by understanding the material properties of the spacer 264 (as well as the optical properties of the lens 202), a relationship may be established between the length 266 of the spacer 264 and the lens temperature of the lens 202, which may then be correlated to the focal distance 132 (FIG. 2) of the lens 202. As such, when a change in one or more of the optics-related parameters associated with the lens 202 results in an FD variation 134, the lens temperature may be controlled (via the thermal device 144) such that the length 266 of the spacer 264 is increased or decreased sufficiently to reduce or offset the FD variation 134.

It should be appreciated by those of ordinary skill in the art that temperature sensitive spacers, such as the spacer 264 described above, are typically utilized to create an athermal lens designs. In such applications, the length of the spacer is specifically tailored such that, for a given temperature change, the spacer expands or contracts by an amount that offsets any variation in the focal distance that may occur due to lens temperature changes. However, for the embodiment shown in FIG. 7, the length 266 of the spacer 264 may be specifically chosen such that, for a given temperature change, the spacer expands or contracts by an amount that provides for an additional variation in the focal distance over that which would otherwise occur due to changes in the temperature associated with a lens element, thereby allowing for the disclosed system 120 to account for FD variations caused by any optics-related parameters associated with the lens 202.

It should also be appreciated that the temperature sensitive lens 202 may have any other suitable lens configuration known in the art that allows for the focal distance 132 (FIG. 2) of the lens 202 to change with changes in temperature. For example, as indicated above, the lens 202 may simply include a single lens element 212 that, due to thermal expansion, experiences a variation in its radius (and, thus, a variation in its focal distance) with changes in temperature. Alternatively, the lens 202 may include any other suitable combination of optical elements having any suitable optical arrangement. For instance, in a doublet or triplet lens arrangement, the lens elements 212 may have differing coefficients of thermal expansion such that the varying rates of thermal expansion cause deformation, thereby leading to a variation in the focal distance.

Additionally, it should be appreciated that the present subject matter is also directed to a method for controlling the focus of a lens, such as the lenses 102, 202 described above. For example, in several embodiments, the method may include detecting a change in an optics-related parameter that is sufficient to cause a variation in a focal distance 132 of the lens 102, 202, determining a temperature adjustment for the lens 102, 202 based on the change in the optics-related parameter that will reduce the variation in the focal distance 132 and adjusting a lens temperature of the lens 102, 202 based on the determined temperature adjustment.

Moreover, it should be appreciated that the various components of the disclosed system 120 (e.g., the parameter sensor 140, temperature sensor 142, thermal device 144 and controller 146) may, in one embodiment, be integrated into the design and/or configuration of an image capture device, such as the image capture device 100 described above with reference to FIG. 1. Alternatively, one or more of the components of the disclosed system 120 may be configured as separate components from an image capture device. For instance, in one embodiment, the parameter sensor 140, temperature sensor 142 and thermal device 144 may be integrated into the design and/or configuration of an image capture device while the controller 146 may be configured as a separate component.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling the focus of a lens, the method comprising:

detecting, by one or more computing devices, a change in a focal distance of the lens;

determining, by the one or more computing devices, a temperature adjustment for the lens that will reduce the variation in the focal distance; and adjusting, by the one or more computing devices, a lens temperature of the lens based on the determined temperature adjustment.

2. The method of claim 1, wherein detecting a change in a focal distance of the lens comprises indirectly detecting the change in the focal distance by detecting a change in an optics-related parameter associated with the lens.

3. The method of claim 2, wherein detecting a change in an optics-related parameter associated with the lens comprises detecting a Change in at least one of pressure, humidity or object distance.

4. The method of claim 2, wherein determining a temperature adjustment for the lens comprises determining a temperature adjustment for the lens that will offset the variation in focal distance caused by the change in the optics-related parameter.

5. The method of claim 4, wherein determining a temperature adjustment for the lens that will offset the variation in focal distance caused by the change in the optics-related parameter comprises:

determining a variation amount in the focal distance caused by the change in the optics-related parameter; and determining a desired lens temperature for the lens based on the variation amount in the focal distance.

6. The method of claim 5, wherein the variation amount is determined based on a known relationship between the focal distance and the optics-related parameter.

7. The method of claim 5, wherein the desired lens temperature is determined based on a known relationship between the focal distance and the lens temperature.

8. The method of claim 1, wherein adjusting a lens temperature of the lens based on the determined temperature adjustment comprises adjusting the lens temperature using a thermal device.

9. A system for controlling the focus of a lens, the system comprising:

a sensor configured to indirectly detect changes in a focal distance of the lens by detecting changes in an optics-related parameter associated with the lens, the optics-related parameter corresponding to at least one of pressure, humidity or object distance;

a thermal device configured to adjust a lens temperature of the lens; and one or more computing devices communicatively coupled to the sensor and the thermal device, the one or more computing devices being configured to control the thermal device such that the lens temperature is adjusted in a manner that reduces variations in the focal distance of the lens.

10. The system of claim 9, wherein the one or more computing devices are configured to determine a variation amount in the focal distance caused by a change in the optics-related parameter, the one or more computing devices being further configured to determine a temperature adjustment for the lens temperature based on the variation amount.

11. The system of claim 10, wherein the variation amount is determined based on a known relationship between the focal distance and the optics-related parameter.

12. The system of claim 10, wherein the temperature adjustment is determined based on a known relationship between the focal distance and the lens temperature.

13. The system of claim 9, further comprising a temperature sensor configured to monitor the lens temperature of the lens.

14. The system of claim 9, wherein the one or more computing devices are configured to control the thermal device such that the lens temperature is adjusted in a manner that offsets the variations in the focal distance.

15. An image capture device, comprising:

a lens defining a focal distance, the lens including a lens element, a lens housing and a temperature-sensitive spacer coupled between the lens element and the lens housing;

a sensor configured to detect changes in a focal distance of the lens;

a thermal device configured to adjust a lens temperature of the lens; and one or more computing devices communicatively coupled to the sensor and the thermal device, the one or more computing devices being configured to control the thermal device so as to control a temperature associated with the temperature-sensitive spacer in a manner that reduces variations in the focal distance.

16. The image capture device of claim 15, wherein the lens is configured as a temperature-sensitive lens.

17. The image capture device of claim 15, wherein the lens comprises a lens element, Wherein the thermal device comprises at least one of a heating element or a cooling element wrapped around a circumference of the lens element or the thermal device comprises a conductive film formed on a surface of the lens element.

* * * * *